United States Patent [19]

Curtiss et al.

[11] E Re. 28,467

[45] Reissued July 8, 1975

[54] THROWING MEMBER AND PAIR OF MULTIPLE-TARGET AREA POST MEMBERS

[76] Inventors: Frank E. Curtiss, 819 East Erie St., Painesville, Ohio 44077; Jack E. Curtiss, 246 Corduroy Rd., Mentor, Ohio 44060

[22] Filed: Aug. 31, 1973

[21] Appl. No.: 393,551

Related U.S. Patent Documents

Reissue of:

[64] Patent No.: 3,602,509
Issued: Aug. 31, 1971
Appl. No.: 857,084
Filed: Sept. 11, 1969

[52] U.S. Cl. ..... 273/100; 273/104; 273/106 B
[51] Int. Cl. ..... A63b 71/00
[58] Field of Search ..... 273/100, 104, 106 B, 102 R

[56] References Cited

UNITED STATES PATENTS

| | | | |
|---|---|---|---|
| 1,030,478 | 6/1912 | Messacar | 273/106.2 |
| 1,547,273 | 7/1925 | Trayers | 273/100 |
| 2,076,010 | 4/1937 | String | 273/100 |
| 2,809,837 | 10/1957 | Shepherd | 273/100 |
| 2,998,976 | 9/1961 | Lewis | 273/100 |
| 3,507,496 | 4/1970 | Miller | 273/100 |
| 3,586,330 | 6/1971 | Lema | 273/100 |

*Primary Examiner*—Richard C. Pinkham
*Assistant Examiner*—Marvin Siskind
*Attorney, Agent, or Firm*—Teare, Teare & Sammon

[57] ABSTRACT

A game system including a pair of post members each of multiple target-like construction adapted to be mounted in upstanding, spaced-apart relation on a support surface and a plurality of throwing members each of multiple scoring construction adapted to be thrown by accuracy of the user onto respective of the post members for registering the scoring areas of the throwing members with the target areas of the post members to achieve a predetermined game score. [ The throwing members are generally horseshoe-shaped and have two parallel side arms and a central arm between the side arms. Each post member has an inverted U-shaped lower section whose legs may be inserted in the ground, and a U-shaped upper section. ] *Each of said post members includes a closed target area and a plurality of upstanding arms defining other target areas.*

13 Claims, 6 Drawing Figures

INVENTORS
FRANK E. CURTISS
JACK E. CURTISS
BY

Teare, Teare & Sammon
ATTORNEYS

INVENTORS
FRANK E. CURTISS
JACK E. CURTISS
BY
Teare, Teare & Sammon
ATTORNEYS

THROWING MEMBER AND PAIR OF MULTIPLE-TARGET AREA POST MEMBERS

Matter enclosed in heavy brackets [ ] appears in the original patent but forms no part of this reissue specification; matter printed in italics indicates the additions made by reissue.

BACKGROUND OF THE INVENTION

The present invention relates in general to gaming devices and more particularly relates to a new and novel game system and method for playing the same adapted for use as an outdoor field game and/or as an indoor game by practically persons of all ages. *This application is a Reissue of Application Ser. No. 857,084 filed September 11, 1969 now Patent No. 3,602,509.*

Heretofore, many types of indoor as well as outdoor field games have been provided for recreational and amusement as well as for physical benefits to the user. The game system of the present invention is referred to herein under the trade name "TORII" and, though different, is somewhat akin to the outdoor field game commonly referred to as horseshoes in which a series of metal shoes are pitched by the user around spaced metal stakes to register a score. Though popular for many years, the game of horseshoes has certain disadvantages for many users and/or applications. In such game, the metal shoes are generally of a heavy construction limiting the use of the game in the main to persons of greater strength and older ages. In addition to being somewhat difficult to handle, the metal shoes have a tendency to dig up or damage the ground in the area of the stakes and hence, generally require the provision of special earthen or clay pits adjacent the stakes to receive the impact from the metal shoes. Further, the open C-shaped construction of the metal shoes requires considerable skill to register a score and limits the scoring possibilities by the average user. For example, in the game of horseshoes scores are registered only by a ringer, a leaner or by one of the shoes being in close proximity to the stake when lying on the ground. Still further, such game is not only relatively expensive to produce, but is bulky and space consuming to store and is relatively costly to ship. Other outdoor field games including thrown or flying projectiles such as darts, arrows and the like have been provided are subject generally to the same disadvantages aforementioned in connection with the game of horseshoes. In addition, such other games are by their nature oftentimes dangerous to the user and hence, in many cases limits use of the game to persons of older age.

SUMMARY OF THE INVENTION

A game system and method for playing the same comprising, a pair of generally rigid post members each having a multiple target-like construction adapted to be mounted in upstanding, spaced apart relation on a support surface, and one or more generaly symmetrical throwing members of relatively lightweight, multiple scoring area construction adapted to be thrown by accuracy of the user onto the respective post members for registration of the scoring areas of the throwing members with the target-like construction of the post members to give a score in accordance with a predetermined game scoring system.

By the foregoing, there is provided a new and novel game system particularly suited for use as an outdoor field game, but which may also be used as an indoor game, as desired. The game has great versatility for recreational and amusement purposes as well as giving physical benefits to persons of practically all ages.

The game system of the present invention has many advantages over heretofore known related types of indoor or outdoor types of field games in that it may be played without requiring a high degree of skill and affords great versatility through the manner by which scores are registered by the user thereby adding to the enjoyment in playing the game. The game system is constructed and arranged to retain the attentiveness of the user and provides a continuing challenge for accuracy though not requiring a great deal of skill. The game system is of a lightweight, yet durable construction which cannot be easily damaged and which eliminates any damage to the playing area, such as to the ground, grass or the like. The game system can be played by children of practically all ages as well as adults and by its construction guards against any accidental injury to the user. Further, the game system may be readily assembled or disassembled for use or for compact storage or shipment and is relatively inexpensive to produce and maintain. Other objects and advantages of the invention will become apparent in the following description and accompanying drawings.

DESCRIPTION OF THE PREFERRED EMBODIMENTS

Figure 1:
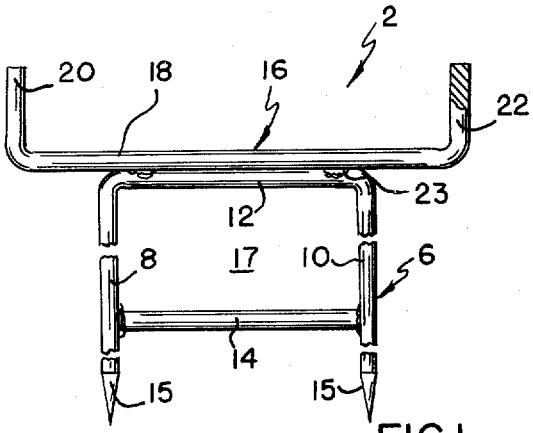
FIG. 1 is a front elevation view, partially broken away and partially in section, showing one of the post members made in accordance with the present invention.
Figure 2:
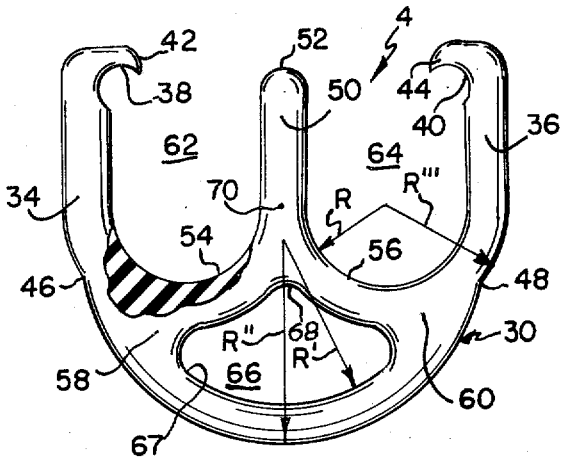
FIG. 2 is a top plan view, partially in section, showing one of the throwing members made in accordance with the present invention.
Figure 3:
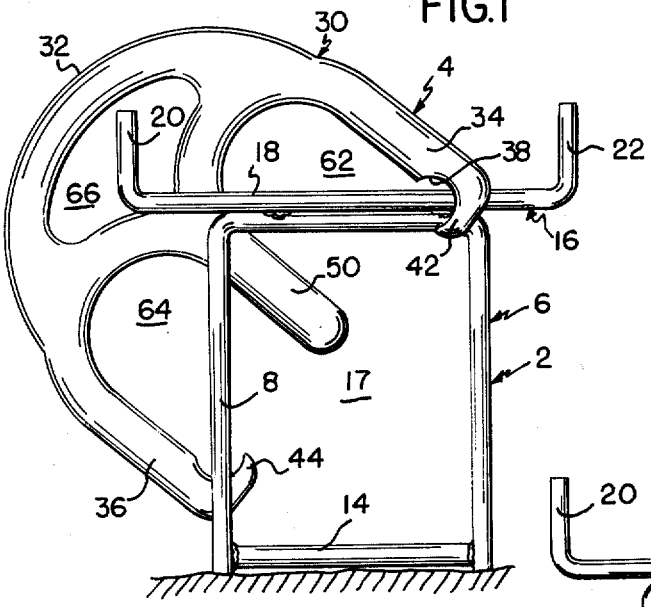
FIG. 3 is a front elevation view showing use of the game system for scoring points in one form.

Referring again to the drawings and particularly to FIGS. 1 to 3 thereof, there is illustrated the game system of the present invention for use as an outdoor field game. Generally, in the invention the game system includes a pair of post members, designated generally at 2, with only one being shown driven into the ground, as best seen in FIG. 3. The post members 2 are adapted to receive in registered scoring relation the respective throwing members, designated generally at 4, in various scoring positions thereon. In the invention, one, two, three or any number of throwing members may be employed dependent upon the number of users playing the game.

As best seen in FIG. 1, the respective post members 2 are of a generally rigid multiple target construction to provide the maximum scoring possibilities upon registration by a respective one of the throwing members 4. In the invention, the post members 2 are preferably made from rigid high strength materials, such as metal, plastic and the like, as desired.

In the form shown, the post members 2 each include a generally inverted U-shaped frame section 6 including a pair of spaced parallel legs 8 and 10 which extend downwardly from an interconnecting bight portion 12 to provide the configuration shown. Preferably, the legs 8 and 10 are interconnected adjacent the end remote from the bight portion 12 by a crosspiece 14. In the form shown, the legs 8 and 10 may be provided at their distal ends with sharpened points, as at 15, to facilitate insertion of the post into the ground. The legs 8 and 10, the bight portion 12 and the crosspiece 14 together define a generally polygonal, such as rectangular, opening 17 which defines a scoring area interiorly between the legs 8 and 10 for receipt of portions of the throwing members 4, as hereinafter will be more fully described.

In the form shown, another frame section 16 of generally U-shaped construction is attached, as at 23, by weldments or the like to the lower frame section 6. The frame section 16 includes a pair of spaced parallel legs 20 and 22 which extend upwardly from a bight or base member 18. As shown, the base member 18 has greater length than the bight portion 12 of the frame section so as to overhang the legs 8 and 10 on either side of the frame section 6. By this arrangement, the legs 20 and 22 are disposed in laterally offset relation to opposite sides of the frame section 6 so as to afford multiple target-like areas or projections for registration with scoring areas on the throwing members 4, as desired. Though the post members 2 have been illustrated as a two-piece construction attached together, such as by weldments, it is to be understood that the post members could be made of an integral one-piece construction, as desired. In addition, the elements of the frame sections 6 and 16 though illustrated as being of a cylindrical construction may be made in other cross-sectional shapes, as desired.

In one embodiment, the following dimensions have been found preferable for the post members. The distance between the legs 8 and 10 about 7 inches to center, the length of the legs 8 and 10 about 18 inches to center, the distance between the bight portion 12 and the crosspiece 14 about 9¼ inches to center, the height of the legs 20 and 22 about 2½ inches to center, and the distance between the legs 20 and 22 about 12 inches to center. In the form shown, all the elements of the post members are made of ½-inch steel rod.

As best seen in FIG. 2, the throwing members 4 are of a generally U-shaped construction having a generally flat body 30 in cross section and which body is generally of a planar construction. The body 30 includes an arcuate handle section 32 which curves smoothly outwardly and upwardly into a pair of spaced parallel arms 34 and 36 which are made integral therewith and extend from the handle section 32. The arms 34 and 36 are provided at distal ends with generally semi-circular cut out portions 38 and 40 which define terminal hook elements 42 and 44 which turn down and inwardly toward the handle section 32. As shown, the hook elements 42 and 44 are offset inwardly from the arms 34 and 36 with respect to the longitudinal central axis of the body 30 so as to provide a generally overhanging relation for hooking securement around portions of the respective post members 2. The arms 34 and 36 merge smoothly in offset relation, as at 46 and 48, into the handle section 32 so as to provide an optimum transverse distance between the arms 34 and 36 in relation to the widthwise dimension of the body 30. In the form shown, the body 30 is provided with a generally centrally disposed arm 50 which generally bisects the distance between the arms 34 and 36. The arm 50 is rounded off, as at 52, at one end and is provided at its other end with a generally inverted Y-shaped construction defined by a pair of inwardly and outwardly arcuate bight portions 54 and 56 which smoothly merge into web sections 58 and 60 made integral with the body 30 generally adjacent the juncture of the arms 34 and 36 with the handle section 32. The arms 34 and 36 together with the arm 50 and the bight portions 54 and 56 together define a generally W-shaped configuration on the side remote from the handle section 32. This construction provides a pair of laterally spaced, generally U-shaped scoring openings or areas 62 and 64 which open outwardly in a direction away from the handle section 32. In the form shown, the arm 50 is of a lesser length as compared to the length of the arms 34 and 36 and extends generally parallel with respect thereto.

The handle section 32 together with the bight portions 54 and 56 and the webs 58 and 60 define a generally elongated opening 66 having a recess portion 68 opposite the arm 50 which provides another target area 66 for registration with the legs 20 and 22 of the respective post members 2. Though only one such target area 66 has been illustrated, it is to be understood that the handle section may be constructed with one or more openings with varying shapes in accordance with the principles of the present invention.

In the embodiment shown, the following dimensions have been found preferable for the throwing members. The throwing members have an overall length of about 6 5/16 inches and a width across the arms 34 and 36 of about 12 inches. The width of the handle section 32 and of the arms 34 and 36 is about 1⅛ inches and the thickness thereof is about ½ inch. The arm 50 has a length of about 3¾ inches to the radius point 70. The radii R are about 2⅛ inches, the radius R′ about 4⅜ inches, the radius R″ about 5½ inches and the radius R‴ about 3¼ inches. Preferably, the throwing members 4 are made of a durable high strength material, such as of an elastomeric or polymeric material. For example, the members may be made of rubber, a reinforced or corded rubber or of a plastic material. In the invention, it is preferred that the post members have a weight between about 12 oz. to 20 oz. with the preferred weight being about 17 oz. The weight and dimensions of the throwing members are proportioned so that the throwing members may be caused to be accurately thrown and hooked around the respective post members for registration of the respective scoring areas, as at 62, 64 and 66, with the respective target elements and areas defined by the post members. The preferred throwing member is, therefore, light in weight and accurately balanced so that the same may be readily thrown by the user into scoring registration with the respective post members with minimum effort. The throwing members are constructed to combine lightweight, yet high strength, characteristics with optimum flight characteristics so as to enable the members to be easily thrown and projected through the air onto the post members with sufficient weight and friction between the throwing members and the post members to resist the gravitational downward pull after the throwing members are in scoring registration with the post members.

In playing the game system of the present invention and with reference to FIGS. 3 to 6 of the drawings, the post members may simply be pushed into the ground to enable the post members to project about 9½ inches from the ground. The members may be pushed into the ground by hand or by foot, as desired. Preferably, the post members are spaced apart a distance between about 20 to 24 feet.

In playing the game, all points count and it is preferred that no one point cancels another point with the total point count for the game being 31 points.

Figure 4:
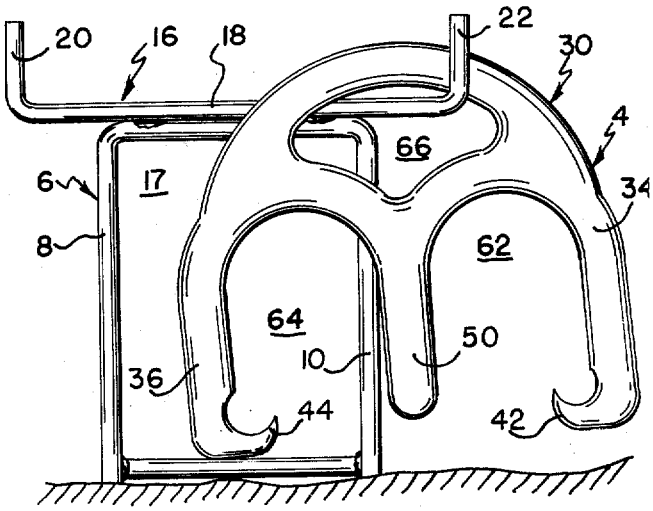
FIG. 4 is a front elevation view of the game system for scoring points in another form.
Figure 5:
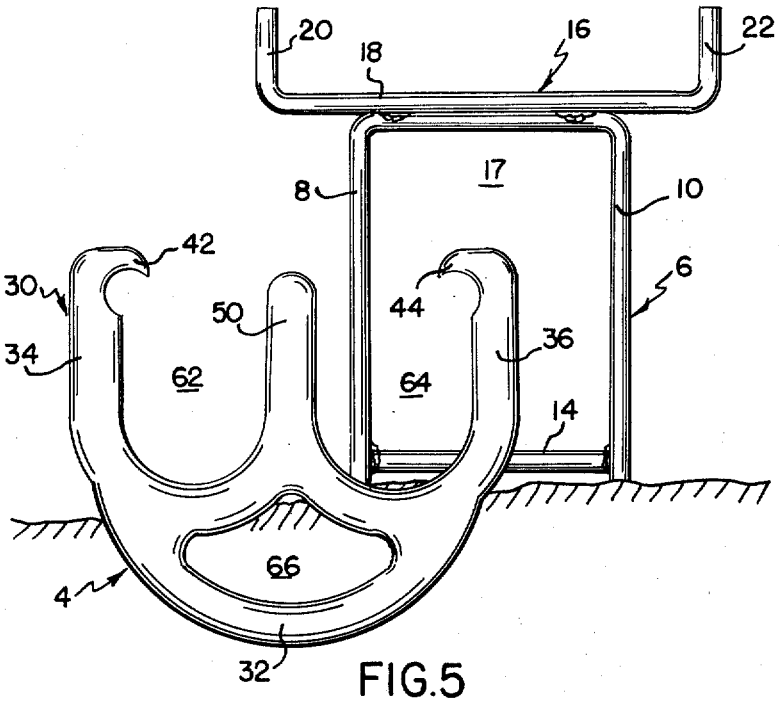
FIG. 5 is a front elevation view of the game system showing the scoring of points in still another form.
Figure 6:
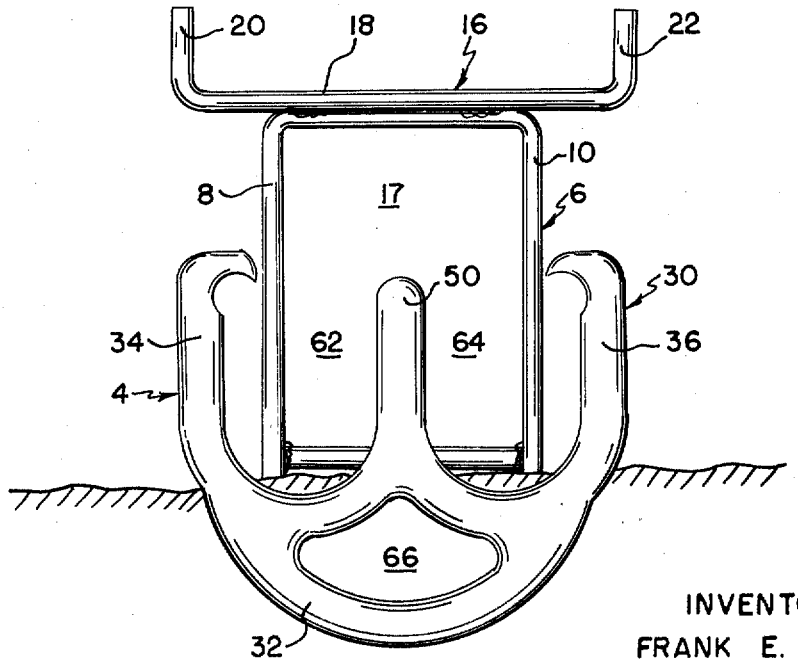
FIG. 6 is a front elevation view of the game system for scoring points in yet another form.

As an example, in one form for playing the game system points may be scored in at least six different manners with one of the throwing members 4. Accordingly, one point may be scored for a throwing member being disposed in the closest proximity to a respective one of the post members 2 (not shown) by laying on the ground or leaning against the post member. Two points may be scored for a "single", as in FIG. 5, where the scoring area 64 is registered around one of the legs 8 or 10 in the target area 17. Four points may be scored for a "double" where both scoring areas 62 and 64 (FIG. 6) are registered with the legs 8 and 10 of the target area 17. Six points may be scored for a "hanger" where one of the scoring areas 62 or 64 or one of the hook elements 42 or 44 are hooked or looped around the respective of the post member elements, as at 12, 18, 20, 22, etc., as seen in FIG. 3. In addition, eight points may be scored for a combination of a "hanger" and a "single" where the aforementioned hooked or looped relation of FIG. 3 exists in conjunction with one of the scoring areas, as at 64, being disposed around one of the legs 8 or 10 for a "single", as aforesaid in connection with FIG. 5. Finally, ten points may be scored for a "handle" where the scoring area or opening 66 in the base or handle section 32 is disposed in hooked or looped relation around one of the generally L-shaped legs 20 or 22 of the respective post member 2, as best seen in FIG. 4. In the invention, the post 2 and throwing members 4 are preferably of identical construction with the preferred number of throwing members being four.

By the foregoing arrangement, the post members 2 provide multiple target areas and are of a relatively rigid construction so as to receive the throwing members 4 in scoring registration therewith. The throwing members 4 have a body 30 made preferably of a relatively flexible construction having a generally loop-like configuration with the multiple arm arrangement which defines multiple scoring areas in addition to the apertured handle section 32 to provide multiple scoring registration with the post members 2. In addition, to the multiple target area construction, the post members 2 incorporate a durable construction for quick and easy insertion into the ground via the crosspiece 14 which also acts as a depth gauge to limit movement of the post to a predetermined depth in the ground.

I claim:

1. A game system comprising, a pair of post members each having a multiple-target-arealike construction adapted to be mounted in spaced apart relation on a support surface, at least one throwing member having multiple-scoring-arealike construction adapted to be thrown into scoring registration with said post members, said post members each include a generally inverted U-shaped lower section defining a closed target area, and a generally U-shaped upper section made integral with said lower section and facing outwardly away from said lower section.

2. A game system in accordance with claim 1, wherein said post members each include a lower section defined by a pair of spaced legs extending outwardly from a bight portion, and an upper section defined by another pair of spaced legs extending outwardly from said bight portion in the opposite direction from said first-mentioned pair of legs.

3. A game system in accordance with claim 2, wherein the legs of said upper section are laterally offset outwardly with respect to the legs of said lower section, and the legs of said upper section having a reduced length as compared to the legs of said lower section.

4. A game system in accordance with claim 1, wherein said throwing members each include a generally looplike body having a handle section and a plurality of spaced arms extending outwardly from said handle section and define therebetween multiple target areas.

5. A game system in accordance with claim 4, wherein said handle section includes at least one opening therein defining another target area.

6. A game system in accordance with claim 4, wherein certain of said arms include hooklike portions adjacent the distal ends thereof.

7. A game system in accordance with claim 1, wherein said throwing members each include a generally looplike body having a handle section and a plurality of elongated spaced arms made integral with and extending outwardly from said handle section, said arms connected together at one end by at least one pair of spaced, arcuate web portions defining with said arms a pair of generally U-shaped openings which open outwardly in a direction away from said handle section.

8. A game system in accordance with claim 7, including said arms being parallel, and another arm made integral with said handle section and extending outwardly generally centrally between said pair of arms.

9. A game system in accordance with claim 8, wherein the arms of said pair each include hooklike portions adjacent the free ends thereof, and said other arm being foreshortened with respect to said pair of arms.

10. A game system comprising, a pair of post members each having a multiple-target-arealike construction adapted to be mounted in spaced apart relation on a support surface, at least one throwing member having multiple-scoring-arealike construction adapted to be thrown into scoring registration with said post members, said post members each include a lower section defined by a pair of spaced legs extending outwardly from a bight portion, an upper section defined by another pair of spaced legs extending outwardly from said bight portion in the opposite direction from said first-mentioned pair of legs, the legs of said upper section are laterally offset outwardly with respect to the legs of said lower section, and the legs of said upper section having a reduced length as compared to the legs of said lower section.

11. A game system comprising, a pair of post members each having a multiple-target-arealike construction adapted to be mounted in spaced apart generally upright relation on a support surface, at least one throwing member having multiple-scoring-arealike construction adapted to be thrown into scoring registration with said post members, said post members each including a lower section defined by a pair of spaced legs extending in generally the same direction from a bight portion being adapted for mounting on said support surface, an upper section defined by another pair of spaced legs extending outwardly from said bight portion in the opposite direction from said first-mentioned pair of legs, said throwing members each including a generally looplike body having a handle section and pair of spaced generally parallel arms made integral with and extending outwardly from said handle section, said arms connected together at one end by at least one pair of spaced, arcuate web portions defining with said handle section and opening defining another target area, and another arm made integral with said web portions and extending outwardly generally centrally between said pair of arms defining with said arms a pair of generally U-shaped openings which open outwardly in a direction away from said handle section, adapted to receive the post members therein in scoring registration.

12. A game system comprising, a pair of post members each having a multiple-target-arealike construction adapted to be mounted in spaced apart generally upright relation on a support surface, at least one throwing member having multiple-scoring-arealike construction adapted to be thrown into scoring registration with said post members, said post members each including an upper section defined by a pair of spaced legs extending outwardly from a bight portion, a lower section including at least one leg extending outwardly from said bight portion in the opposite direction from said first-mentioned pair of legs being adapted for mounting on said support surface, said throwing member including a generally looplike body having a handle section and a pair of spaced generally parallel arms made integral with and extending outwardly from said handle section, and another arm made integral with said handle portion and extending outwardly generally centrally between said pair of arms defining with said arms a pair of generally U-shaped openings which open outwardly in a direction away from said handle section and adapted to receive the post members therein in scoring registration.

*13. A game system comprising,*

*a pair of post members each having a multiple target area-like construction adapted to be mounted in spaced apart relation on a support surface,*

*at least one throwing member having multiple scoring-like construction adapted to be thrown into scoring registration with respect to the above said post members,*

*each of said post members includes a closed target area and a plurality of arms defining other target areas,*

*said closed target area is defined by a pair of legs which are connected at one end to one another and by a cross piece which is connected between and spaced from said one end of said legs, and*

*said legs extend beyond said cross piece being adapted at their opposite end for supporting engagement with said support surface.*

* * * * *